US012166738B2

(12) United States Patent
Brevoort et al.

(10) Patent No.: US 12,166,738 B2
(45) Date of Patent: Dec. 10, 2024

(54) CONTEXTUAL DISCOVERY AND DESIGN OF APPLICATION WORKFLOW

(71) Applicant: Salesforce, Inc., San Francisco, CA (US)

(72) Inventors: Michael Brevoort, Littleton, CO (US); Angela Kirchhof, Denver, CO (US); Elizabeth Ireland Powers, San Francisco, CA (US); Kyle Turman, Oakland, CA (US)

(73) Assignee: Salesforce, Inc., CA (US)

( * ) Notice: Subject to any disclaimer, the term of this patent is extended or adjusted under 35 U.S.C. 154(b) by 100 days.

(21) Appl. No.: 17/899,934

(22) Filed: Aug. 31, 2022

(65) Prior Publication Data

US 2022/0417200 A1 Dec. 29, 2022

Related U.S. Application Data

(63) Continuation of application No. 17/186,717, filed on Feb. 26, 2021, now Pat. No. 11,444,903.

(51) Int. Cl.
*H04L 51/52* (2022.01)
*G06F 3/0481* (2022.01)
*H04L 51/42* (2022.01)

(52) U.S. Cl.
CPC ............ *H04L 51/42* (2022.05); *G06F 3/0481* (2013.01)

(58) Field of Classification Search
CPC .............................. H04L 51/42; G06F 3/0481
See application file for complete search history.

(56) References Cited

U.S. PATENT DOCUMENTS

| | | | |
|---|---|---|---|
| 6,225,998 B1 | 5/2001 | Okita | |
| 8,849,691 B2 | 9/2014 | Sanabria | |
| 9,141,345 B2 | 9/2015 | Armour | |
| 9,313,207 B2* | 4/2016 | Cicchitto | ............ G06F 21/6227 |
| 9,395,959 B2 | 7/2016 | Hatfield | |
| 10,216,903 B2 | 2/2019 | Thomas | |
| 10,375,003 B1* | 8/2019 | Olsen | ..................... G06Q 40/02 |
| 10,409,558 B2 | 9/2019 | Kumar | |

(Continued)

OTHER PUBLICATIONS

"Die, Email, Die! A Flickr Cofounder Aims To Cut US All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013) 2 pages.

(Continued)

*Primary Examiner* — Tadesse Hailu
(74) *Attorney, Agent, or Firm* — Lee & Hayes, P.C.

(57) ABSTRACT

Media, methods, and systems are disclosed for contextual discovery and design of application workflow. An event message associated with a user interface control and with an instance of an event is displayed in a communication channel of a group-based communications system. In response to detecting an actuation, by a user, of the user interface control associated with the event message, a workflow creation interface is displayed to configure a new workflow triggered by an instance of an event associated with the event message. Inputs are received from the user, such that the inputs are associated with one or more user-created workflow operations. In response to detecting a triggering event corresponding to the new workflow, the new workflow is executed to carry out the user-created workflow operations.

20 Claims, 11 Drawing Sheets

(56) References Cited

U.S. PATENT DOCUMENTS

| | | | |
|---|---|---|---|
| 10,552,796 | B1* | 2/2020 | Delacourt .......... G06Q 10/103 |
| 10,678,418 | B1 | 6/2020 | Nelson |
| 10,754,626 | B2 | 6/2020 | Cerar |
| 10,979,432 | B1* | 4/2021 | Frank .................... H04L 63/104 |
| 11,176,534 | B1 | 11/2021 | Pandey |
| 2003/0050797 | A1 | 3/2003 | Brandt et al. |
| 2004/0187140 | A1 | 9/2004 | Aigner |
| 2006/0136833 | A1 | 6/2006 | Dettinger |
| 2006/0143270 | A1* | 6/2006 | Wodtke ................ G06Q 10/107 709/206 |
| 2009/0006154 | A1 | 1/2009 | Hao |
| 2010/0005398 | A1 | 1/2010 | Pratley |
| 2011/0113348 | A1 | 5/2011 | Twiss |
| 2012/0011239 | A1 | 1/2012 | Svane |
| 2012/0197975 | A1 | 8/2012 | Samson et al. |
| 2013/0179208 | A1 | 7/2013 | Chung |
| 2014/0337071 | A1 | 11/2014 | Stiffler |
| 2016/0004565 | A1* | 1/2016 | Harper ............ G06Q 10/06316 718/102 |
| 2016/0366240 | A1 | 12/2016 | Haapanen |
| 2017/0039046 | A1* | 2/2017 | Henke ................ G06Q 10/0631 |
| 2017/0083386 | A1 | 3/2017 | Wing |
| 2017/0147296 | A1 | 5/2017 | Kumar |
| 2017/0185255 | A1 | 6/2017 | Brunswig |
| 2017/0192950 | A1 | 7/2017 | Gaither |
| 2017/0329957 | A1* | 11/2017 | Vepa .................... G06F 21/445 |
| 2018/0107461 | A1 | 4/2018 | Balasubramanian et al. |
| 2018/0287982 | A1 | 10/2018 | Draeger et al. |
| 2019/0052840 | A1 | 2/2019 | Taylor |
| 2019/0213518 | A1 | 7/2019 | Lee |
| 2020/0042609 | A1* | 2/2020 | Huang .............. G06F 16/24554 |
| 2020/0174756 | A1* | 6/2020 | Cerar ........................ G06F 8/35 |
| 2020/0210322 | A1 | 7/2020 | Sen |
| 2020/0211684 | A1 | 7/2020 | Helton |
| 2020/0334613 | A1 | 10/2020 | Palazzo |
| 2020/0341801 | A1 | 10/2020 | Aziz |
| 2021/0065078 | A1* | 3/2021 | Gardner ............ G06Q 10/0633 |
| 2021/0103863 | A1 | 4/2021 | Hiller et al. |
| 2021/0232992 | A1 | 7/2021 | Disterheft |
| 2021/0365284 | A1 | 11/2021 | Lee |
| 2022/0374794 | A1* | 11/2022 | Shakhnovich ..... G06Q 10/0633 |

OTHER PUBLICATIONS

"How Slack changed the way we work by putting the customer experience first", Repeat Customer Podcast, Episode 3, [online][retrieved May 9, 2019]. Retrieved from the Internet: <URL:https://www.zendesk.com/resources/slack-customer-experience/, (2019) 13 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online][retrieved May 9, 2019]. Retrieved from the Internet: <URL:https://slate.com/business/2014/05/stewart-butterfield-flickr-and-slack-how-he-snatched-victory-from-the-jaws-of-defeat.html>. (dated May 28, 2014) 8 pages.

Ernie Smith, "Picking Up The Slack", TEDIUM, [online][retrieved May 9, 2019]. Retrieved from the Internet: <URL:https://tedium.co/2017/10/17/irc-vs-slack-chat-history/>. (dated Oct. 17, 2017) 13 pages.

Internet Relay Chat, WIKIPEDIA, [online][retrieved May 30, 2019]. Retrieved from the Internet: <URL:https://en.wikipedia.org/wiki/Internet_Relay_Chat>. (dated May 28, 2019) 20 pages.

Jonathan Vanian, "Why these startups think chat apps are the next big thing in workplace collaboration", GIGAOM, Lexisnexis, https://advance.lexis.com/api/permalink/e83778c8-09c8-43aa-9ba0-88526283de69/?context=1000516, (dated Aug. 1, 2014) 4 pages.

Matsumoto, T. et al., "Chocoa Communicator—A New Communication System Based on Awareness and Text Communications-", FUJITSU Sci. Tech. J., 36, 2, (Dec. 2000) 154-161.

Matthew Ingram, "Flickr co-founder launches Slack, an all-in-one messaging tool designed to kill email forever", GIGAOM, Lexisnexis, https://advance.lexis.com/api/permalink/0b676b7c-aec3-4560-861e-d030d1dd008c/?context=1000516, (dated Feb. 12, 2014), 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL:https://www.rfc-editor.org/rfc/rfc1459.txt>. (dated May 1993) 57 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield On How Slack Became A $2.8 Billion Unicorn", FORBES, [online][retrieved May 9, 2019]. Retrieved from the Internet: <URL:https://www.forbes.com/sites/roberthof/2015/06/02/stewart-butterfield-on-how-slack-became-a-2-8-billion-unicorn-2/#7c31937d7d9c>. (dated Jun. 2, 2015), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

Final Office Action mailed Sep. 2, 2021 for related U.S. Appl. No. 17/186,717 entitled "Contextual Discovery and Design of Application Workflow" (15 pages).

Non-Final Office Action mailed Dec. 24, 2021 for related U.S. Appl. No. 17/186,717 entitled "Contextual Discovery and Design of Application Workflow" (14 pages).

Non-Final Office Action mailed Apr. 29, 2021 for related U.S. Appl. No. 17/186,717 entitled "Contextual Discovery and Design of Application Workflow")17 pages).

* cited by examiner

FIG. 6A

Add supported trigger                                        ✕

Select trigger provider and event

[V] Visualization Co.                  ▽  — 602

New Alert                              ▽  — 604

View example event data

Which Visualization account should we use?

Workflow installer                     ▽  — 606

Assign event data to input variables Optional

| Variable | Event data |
|---|---|
| ⊗ Title | ▽ → [ruleName] |

⊕ Assign Another Variable

608

[ Cancel ] [ Next ]

FIG. 6B

Modify supported trigger                                     ✕

[V] Visualization → New Alert         2 input variables — 632

Add conditional filters Optional

| Event data | Condition | Value |
|---|---|---|
| [priority] | equals ▽ | High |

⊕ Add Another Filter

634

[ Back ]                            [ Cancel ] [ Add Trigger ]

630

CONTEXTUAL DISCOVERY AND DESIGN OF APPLICATION WORKFLOW

RELATED APPLICATIONS

This patent application is a continuation application claiming priority benefit, with regard to all common subject matter, of U.S. patent application Ser. No. 17/186,717, filed Feb. 26, 2021, and entitled "CONTEXTUAL DISCOVERY AND DESIGN OF APPLICATION WORKFLOW." The identified earlier-filed application is hereby incorporated by reference in its entirety into the present application.

TECHNICAL FIELD

Embodiments of the invention generally relate to contextual discovery and design of application workflows. More specifically, embodiments of the invention relate to enabling interactive user interface customization in connection with group-based communication system application workflow design.

Automating work processes in connection with group-based communication systems may be accomplished by developing functions and applications in a software programming language that make calls into an application programming interface (API) associated with the group-based communication system. Some group-based communication systems also have graphical workflow development user interfaces that allow a user of the group-based communication system to establish a sequence of operations. Typically a user of the group-based communication system needs to either write code or use an interface that is dedicated to implementing process automation to create a workflow by envisioning what kind of triggers and events may occur and then designing systems to respond accordingly using the specialized, dedicated tools. Use of specialized tools limits the scope of a potential cohort of users who can contribute to implementing workflow in a group-based communication system. Accordingly, what is needed is an easy-to-use interface for discovering and designing workflow in connection with group-based communication systems.

SUMMARY

Embodiments of the invention address the above-identified need by providing mechanisms for discovering, designing, and configuring application workflow in connection with one or more group-based communication systems. In particular, in a first embodiment, the invention includes one or more non-transitory computer-readable media storing computer-executable instructions that, when executed by a processor, perform a method for contextual discovery and design of application workflow in a group-based communication system, the method comprising: displaying an event message in a communication channel of the group-based communications system, wherein the event message is associated with a user interface control and the event message is associated with an event in the group-based communications system, in response to detecting an actuation, by a user, of the user interface control associated with the event message, displaying a workflow creation interface to configure a new workflow triggered by an instance of an event associated with the event message, receiving, from the user, one or more inputs, wherein each input of the one or more inputs is associated with one or more user-created workflow operations, in response to detecting a triggering event corresponding to the new workflow, executing the new workflow to carry out the user-created workflow operations.

In a second embodiment, the invention includes a method for contextual discovery and design of application workflow, the method comprising: displaying an event message in a communication channel of a group-based communications system, wherein the event message is associated with a user interface control and the event message is associated with an event in the group-based communications system, in response to detecting an actuation, by a user, of the user interface control associated with the event message, displaying a workflow creation interface to configure a new workflow triggered by an instance of an event associated with the event message, receiving, from the user, one or more inputs, wherein each input of the one or more inputs is associated with one or more user-created workflow operations, and in response to detecting a triggering event corresponding to the new workflow, executing the new workflow to carry out the user-created workflow operations.

In a third embodiment, the invention includes a system comprising at least one processor and at least one non-transitory memory storing computer executable instructions that when executed by the processor cause the system to carry out actions comprising: displaying an event message in a communication channel of a group-based communications system, wherein the event message is associated with a user interface control and the event message is associated with an event in the group-based communications system, in response to detecting an actuation, by a user, of the user interface control associated with the event message, displaying a workflow creation interface to configure a new workflow triggered by an instance of an event associated with the event message, receiving, from the user, one or more inputs, wherein each input of the one or more inputs is associated with one or more user-created workflow operations, and in response to detecting a triggering event corresponding to the new workflow, executing the new workflow to carry out the user-created workflow operations.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein:

FIGS. 6A and 6B depict exemplary modal dialog boxes for adding or modifying a supported trigger to a workflow in accordance with embodiments of the invention;

DETAILED DESCRIPTION

Context and Concepts of the Invention

Figure 1:
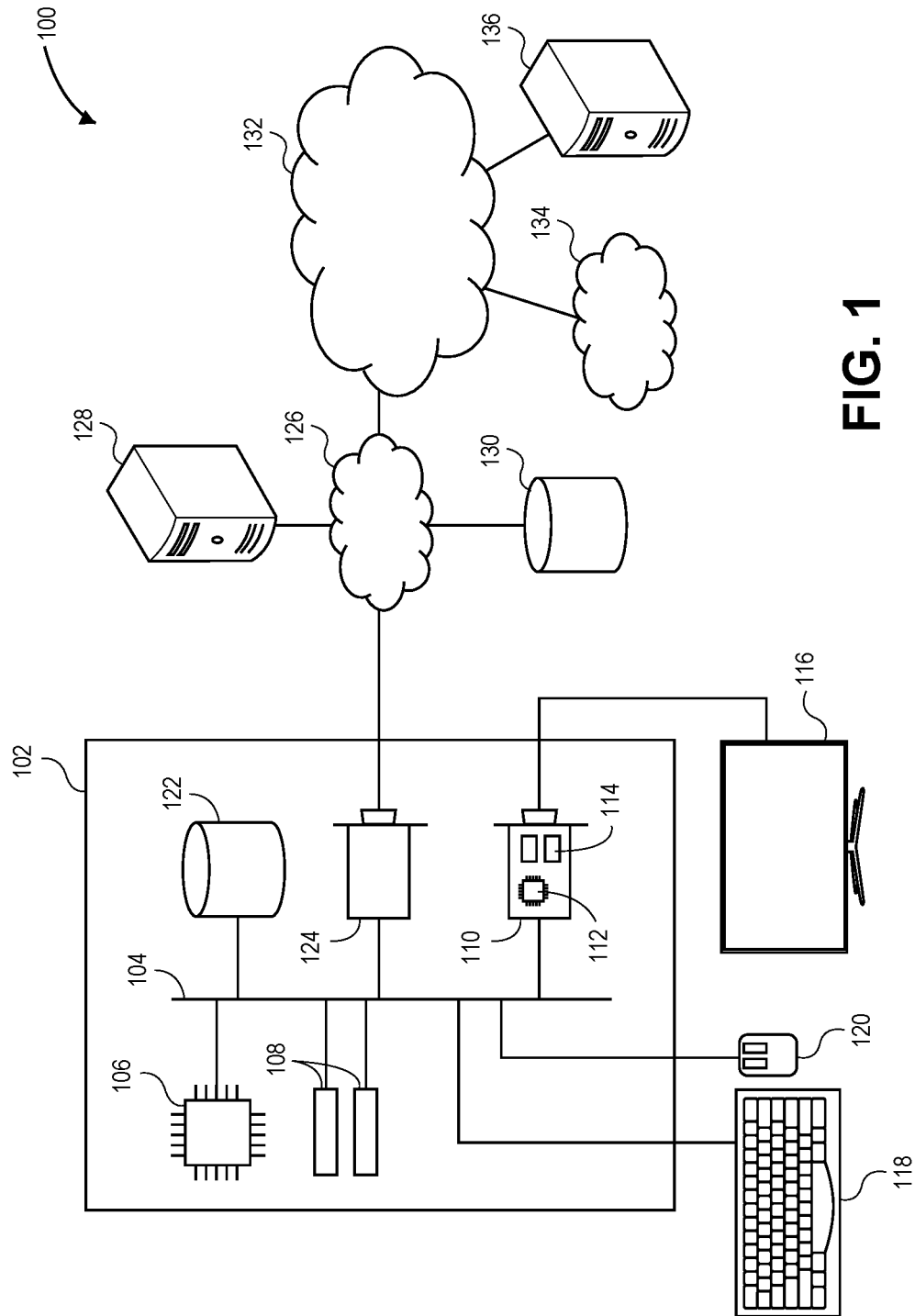
FIG. 1 depicts an exemplary hardware platform for certain embodiments of the invention.

As used herein, the term "group-based communication system" refers to a collaborative communication system used within an organization. In some embodiments, the group-based communication system is a channel-based messaging platform. Within the group-based communication system, communication may be organized into "channels," each dedicated to a particular topic or set of users. Channels are generally long-lasting, persistent discussions of a particular topic. Members of a particular channel can post messages within that channel that are visible to other members of that channel together with other messages in that channel. Users may select a channel for viewing in order to see only those messages relevant to the topic of that channel without seeing messages posted in other channels on different topics. For example, a software development company may have different channels for each software product being developed, where developers working on each particular project can converse without bothering (or being bothered by) developers working on other projects. Because the channels are generally persistent and directed to a particular topic or group, users can quickly and easily refer back to previous communications for reference.

Communication data within a group-based communication system may include messages, queries, files (e.g., documents, spreadsheets, computer code, images, video, audio, and/or electronic contact information), mentions, users or user profiles, interactions (e.g., reactions, edits, deletions, and/or prioritizations such as by pinning or starring), tickets, channels, applications integrated into one or more channels, conversations (e.g., groups of messages that have been segmented as single units), workspaces (e.g., sets of channels, users, projects, tasks within an organization that may have their own sets of permissions and that may be organized substantially in line with an organization chart in some instances) or other data generated by or shared between users of the group-based communication system that are associated with an organization's communication data using the group-based communication system.

In some instances, the communication data may comprise data associated with a user (e.g., a user profile), including, but not limited to, a user identifier, one or more communication channel identifiers associated with communication channels to which the user has been granted access, one or more group identifiers for groups (or organizations, teams, entities, or the like) with which the user is associated, an indication of whether the user is an owner or manager of any communication channels, an indication of whether the user has any communication channel restrictions, a plurality of messages, a plurality of emoji, a plurality of conversations, a plurality of conversation topics, an avatar, an email address, a real name (e.g., Austin Author), a username (e.g., austin_a), a password, user preferences and/or settings, a time zone, a status, a token, and other user-specific information. In some embodiments, the group-based communication system may additionally or alternatively store permissions data associated with permissions of individual users of the group-based communication system. In some embodiments, permissions associated with an individual user can be mapped to, or otherwise associated with, an account or profile associated with user data. Permissions can indicate which users can communicate directly with other users, which channels a user is permitted to access, restrictions on individual channels, which workspaces the user is permitted to access, and restrictions on individual workspaces, for example. In some embodiments, the permissions can support the group-based communication system by maintaining security for limiting access to a defined group of users. In some such embodiments, such users can be defined by common access credentials, group identifiers, or other criteria, as described above.

In some embodiments, the group-based communication system can be partitioned into different workspaces, which can be associated with different groups of users. Each workspace can be associated with a group identifier and one or more user identifiers can be mapped to, or otherwise associated with, the group identifier. Users corresponding to such user identifiers may be referred to as "members" of the group. A workspace may comprise one or more channels that are unique to that workspace and/or one or more channels that are shared between one or more workspaces. In some embodiments, workspaces can be associated with one or more organization identifiers, which can be associated with organizations or other entities associated with the group-based communication system. In some embodiments, such data can be mapped to, or otherwise associated with, other types of data (e.g., user data, permission data, or channel data).

Such deployed applications may both implement group-based communication system application functions as well as invoke group-based communication system application functions associated with other deployed applications. In some embodiments, such an application function is an atomic piece of application logic that can be reused. Broadly speaking, a function defines inputs, outputs, includes application logic to generate the outputs from the inputs. In some cases, functions additionally perform certain specified functionality (also known as "side effects") in addition to generating the outputs. For example, a function post_message( ) may have inputs including a message, a channel identifier and a user identifier. The function application logic has a side effect of posting the provided message, attributed to the indicated user, in the indicated channel, in the return values of "success" and "failure" indicating whether the message was successfully posted.

Generally, a function receives inputs and in response to these inputs, generates either of an error or outputs. The inputs may include any of one or more arguments for the function, a name of the function, and other suitable information used to perform the function. The error may be generated in response to a failure of the function. For example, if a required argument is not provided within the inputs, the function may fail and generate an error. The error may be returned to the group-based communication system server and displayed as an error message on a client device associated with the group-based communication system. Alternatively, outputs may be generated by the function in response to a successful execution of the function. In some embodiments, the outputs (and/or the error) may generate a success event (or, in the case of an error, a failure event) on an event channel in the group-based communication system, allowing users or automated processes to obtain results. As discussed below, this also allows functions to be composed by having an event on the event channel to serve as a trigger condition for another function.

Alternatively, or in addition, in some instances, either of the outputs or the error may be sent directly to a subsequent function as input arguments for the subsequent function. In some embodiments, the inputs may be received as arguments to the function. Further, inputs may be received from the group-based communication system as message or event information. In some embodiments, an undercurrent of data may be associated with a particular channel of the group-based communication system. The undercurrent of data includes various information associated with the group-based communication channel, such as, for example, metadata for messages posted within the channel, user information associated with users added to the channel, and channel information, such as the channel name and channel parameters. Accordingly, any of the information from the undercurrent of data may be sent as an argument for the function. For example, a username and a time for a message may be used as arguments for a function to indicate which user sent the message and the time that the message was sent. For example, a function is contemplated that identifies the last user to post a message within the channel.

In some embodiments, it may be desirable to utilize existing resources associated with the group-based communication channel for the function. For example, channel related information and features such as access control, data scoping, subscriptions, application programming interfaces (API), data loss prevention integration, encryption key management, and international data residency integration may be called upon by the function to provide arguments or triggering events to initiate the function. Accordingly, the existing group-based communication channel may be used as an event channel for the function, where events within the channel may trigger functions, such as, for example, sending a message, adding a user, or reacting to a message. In some embodiments, any content published to the group-based communication channel may be used to trigger and supply arguments to a function.

In some embodiments, events may be published as event messages within a channel of the group-based communication system, where each event message comprises metadata describing the event. Accordingly, functions can be triggered based on events within the channel, as well as when an event message is reacted to or commented on. In some such embodiments, it may be desirable to publish event messages such that the metadata associated with the event message may be used to initiate and supply information to a function. Alternatively, in some embodiments, it may not be desirable to publish all events as event messages within the channel, as doing so might cause users to receive too much unnecessary information. Accordingly, event messages may be filtered such that only certain types of events are published as event messages. Alternatively, event messages may be published to the undercurrent of data for the channel without being visible within the channel to users.

In some embodiments, the function is an object in the context of the group-based communication system, such as an object within an object-oriented programming environment. Accordingly, the function may be stored within a memory, such as a group-based communication system data store and associated with an identifier used to identify the function. Further, in some embodiments, the function may be authenticated by any of the group-based communication system or an external application. In some embodiments, the function may be authenticated in one authentication step that meets the authentication requirements of each of the group-based communication system, and the external application. Additionally, the function may be authenticated along with a user who initiated the function. Accordingly, embodiments are contemplated where a user is authenticated by the group-based communication system and the user does not need to perform further actions to be authenticated by an associated external application. Here, information relating to user authentication may be sent as an argument for the function, by way of a bearer token, for example. As such, if the user is authenticated within the group-based communication system then the user can run a function in connection with an external application. A built-in function is an extension of the core functionality of the group-based communication system, a standard interface to the core API of the group-based communication system.

In some embodiments, a workflow builder user interface is provided so that users of a group-based communication system can build and extend event-based applications without authoring code. The workflow builder user interface may be used automate processes into automated workflows in a group-based communication system. Workflows may be of an arbitrary complexity and may integrate with third-party applications and services. In the context of a workflow, a trigger is what initiates a workflow. Triggers may be automatically generated in response to arbitrary events in the group-based communication system matching pre-specified conditions. Triggers may also be manually initiated, for example by way of a user of a group-based communication system interacting with a shortcut menu that when selected will launch a workflow. In some embodiments, a shortcut menu may be accessed from a menu in a group-based communication system channel.

A workflow may incorporate workflow steps. A workflow step is a unit of execution that performs an action such as sending a group-based communication system message or causing a custom form user interface component to be presented to a user of a group-based communication system. The execution logic corresponding to a workflow step may be exposed from within group-based communication system applications to integrate a particular workflow with external systems (for example, by way of an API for example). When a user building a workflow inserts a step, the workflow-building user may configure one or more parameters to pass along information to entered by end users of the workflow. The workflow-building user may employ a configuration modal dialog box to configure such behavior within the workflow. The configuration modal dialog box contains a set of fields. Each field in the configuration modal dialog box allows the workflow-building user to define a source for the input data that the workflow will consume as input. In some embodiments, the workflow-building user may insert variables surrounded by double curly brackets "{{variables}}" into a plain-text field to auto-populate output data from previous workflow steps.

Various categories of users and organizations interact with exemplary event-driven applications and associated application development, deployment, and hosting environments in several ways. The various types of users and organization include (but are not limited to): (i) end users of a group-based communication system, (ii) workflow users who use pre-built workflows associated with group-based communication systems; (iii) workflow-building users who build workflows to perform automated functionality within a group-based communication system; (iv) users who customize group-based communication system functions and configure associated triggers; (v) subscribing organizations of group-based configuration systems that develop event-based applications by way of group-based communication system functions to support automation required by the subscribing organization; and (vi) partner organizations that develop event-based applications and integrations to operate in connection with group-based communication systems.

As a non-limiting example, an end user of a group-based communication system in the course of using the group-based communication system may use a group-based communication system channel with interactivity to provide feedback regarding a particular product. In so doing, the end user decides that the end user would like to create a similar feedback flow for other end users and other products. Using the group-based communication system, the end user looks for a way to copy or use the same or similar workflow. In this capacity, the end user becomes a workflow user, who may wish to customize an existing workflow. Within the group-based communication system client interface, the end user turned workflow user begins a process of customizing the existing workflow. The workflow user adds a solution based on an existing workflow and customizes the new solution. The workflow user may then add the customized solution to a particular group-based communication system channel. The workflow user may then send a message in-channel to let channel members know about the new solution. Channel members may provide comments regarding the new solution, and based on those comments, the workflow user may update workflow solution configuration by, for example, updating a question in a feedback form associated with the solution.

In another example, while using a group-based communication system, a workflow user may directly have the requirement for the workflow user's team to have a way to review contracts. In this example, the workflow user may browse the available workflows to determine whether an existing workflow can be configured to be used by the team to review contracts. If an existing workflow can simply be configured to allow this, the workflow user may configure and add a solution as described above. Alternatively, the workflow user may determine that no existing workflow exists to meet the needs of reviewing contracts. At this point the workflow user may decide to build a suitable workflow, and the workflow user takes on the role of workflow-building user. In this case, the workflow-building user will open the workflow builder user interface and initiate the process of creating a new workflow. In some embodiments, not all users have authorizations to create new workflows, and an administrative user of the group-based communication system may have to grant permissions to the workflow-building user to create a new workflow.

Once the workflow-building user has initiated the process of creating a new workflow in the workflow builder, the workflow-building user may browse workflow templates to determine whether an existing workflow template exists to use as a basis to build the new workflow. If a template exists, the workflow-building user may open the template, add, modify or delete workflow steps, and define required inputs. If a template does not exist, the workflow-building user may opt to build a workflow from scratch by adding workflow steps as needed and defining required inputs. In either case, the workflow-building user should then test the newly created workflow by running the workflow and observing execution based on a suite of test inputs. Finally, depending on administrative configuration, the workflow-building user may choose to publish the workflow for some or all users of the group-based communication system to use.

To secure access to sensitive information associated with an event-based application running in connection with a group-based communication system, a rich set of administrative functionalities is advantageous. Hosted applications and corresponding functionality that may be utilized by a broader set of users bring about potential data governance concerns, as providing additional data access and other functionality increases complexity of the overall group-based communication system, thereby raising potential issues regarding data security and compliance.

Certain kinds of endorsed workflows may be published only with authorization of an administrative user. In one embodiment, a group-based communication system renders a visible icon in a location within the client interface for workflows that have the endorsement or approval of an organization that has ownership of a group-based communication system workspace. Alternatively or in addition, multiple types of workflows with different user interface appearances are provided for ad-hoc user generated workflows and for workflows that are officially approved by the workspace-owning organization. By way of example, management of an organization may want to provide a workflow for requesting and obtaining approval for vacation. In many organizations it may be desirable for such an "official" workflow to be endorsed by the organization at least for the reason that it may be desirable to have a single source for maintaining information regarding vacation scheduling.

In some embodiments, administrative users of a group-based communication system are able to manage roles corresponding to groups of users that are authorized to develop, deploy, configure, modify and use applications hosted in connection with group-based communication systems. Administrative users may specify which users are able to host applications in connection with a particular organization's group-based communication system. Administrative users may allow a group or groups of users to develop and deploy hosted applications in a safe, sandboxed environment without fear of data traveling outside the organization's boundaries. In some embodiments, test data associated with a sandbox environment will be random data or data that is otherwise sanitized and de-identified of personally identifiable information or other sensitive information. Administrative users may grant a group or groups of users "trusted" permission to deploy hosted applications that are capable of communicating with systems that are external to a group-based communication system, such as an organization's internal on-premises enterprise applications or with other third-party, external systems. Furthermore, administrative users can themselves assign a group or groups of users to be application hosting and/or application development platform administrators.

In order to control data egress, administrative users can control which applications have the capability to make external API calls out to various destinations. These destinations include a particular organization's internal, on premise systems and other third-party, external systems. Administrative users can specify a list of group-based communication system OAuth scopes that are allowed for use in a particular organization's hosted applications. Administrative users can limit where a particular organization's hosted functions and/or triggers can be made available to external organizations. Administrative users can limit which group-based communication system workspaces within a particular organization has access to specified hosted applications. In some embodiments, administrative users may define required fields and values in the application configuration metadata of hosted applications to ensure that access control measures are not circumvented. For various types of hosted applications, administrative users can choose whether a particular hosted application should undergo validation before the hosted application is deployed.

Administrative users may have visibility into and a capability to monitor a number and type of hosted applications, functions, and/or triggers a particular organization is hosting as well as respective owners and/or collaborators who have access and authorization rights to particular applications, functions, and/or triggers. Administrative users may audit the external functions and/or triggers that their organization is using as well as log data regarding inputs, outputs, and state. Administrative users may detect and audit configuration changes to a particular organization's hosted applications. Administrative users may investigate resource consumption and gain insight into how much a particular hosted application costs the organization to host. Administrative users may monitor usage and associated resource consumption of each hosted application and/or function. Administrative users may limit whether a particular organization's triggers may be invoked from a particular webhook. Administrative users may audit which external endpoints a particular organization's applications, functions, and/or triggers have called out to. Administrative users may audit which core group-based communication system API endpoints a particular organization's functions have made calls out to. Administrative users may detect and audit changes to hosting roles and permissions. Administrative users may access source code on which a particular hosted application is based as well as respective source code control change history. Data governance principles are applied such data storage practices are compliant with a particular organization's compliance standards such as enterprise key management and international data residency.

Administrative users may grant to developers hosting-specific roles. Such roles correspond to a set of features that a particular developer can incorporate into the developer's hosted applications, functions, and/or triggers. In some embodiments, administrative users may create new hosting permission roles and specify granular feature availability for the new hosting permission roles. In one embodiment, three discreet roles are provided: basic, basic-plus-storage, and trusted. The basic hosting permission role does not allow data storage. Applications assigned to the basic role (basic applications) may call built-in group-based communication system functions and group-based communication system functions hosted by the same organization. The basic role may not call out to external APIs. Functions implemented and exposed in applications assigned to the basic role can be called by group-based communication system workflows and other group-based communication system functions hosted by the same organization. Basic applications may not themselves be called by group-based communication system functions owned by external organizations, and functions associated with basic applications may not be called by a webhook that a basic application implements. Applications that are assigned to the basic plus storage role have the same characteristics as basic applications with the exception that they may store data. Applications that are assigned to the trusted role (trusted applications) may store data and call and be called the same as a basic application. In addition, trusted applications may call out to external APIs. Trusted applications may also be called by group-based communication system functions owned by external organizations (implementing any necessary authentication and authorization). Functions associated with trusted applications may also be called by a webhook that the trusted application implements.

In some embodiments, when a developer attempts to deploy an application with features that are not authorized due to role-based authorization constraints configured in the application development environment or due to otherwise implemented organizational rules, an error may be returned to the developer, and the application will not be deployed. In some embodiments, a basic application may call a function exposed by a trusted application. In this embodiment, the basic application will need to provide any authentication credentials, such as a bearer token that the trusted application may require.

The subject matter of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Operational Environment for Embodiments of the Invention

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present.

Included in computer 102 is system bus 104, via which other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also, on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media and may be internally installed in computer 102 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the Institute of Electrical and Electronics Engineers (IEEE) 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over public Internet 132. Local network 126 is in turn connected to public Internet 132, which connects many networks such as local network 126, remote network 134 or directly attached computers such as computer 136. In some embodiments, computer 102 can itself be directly connected to public Internet 132.

Figure 2:
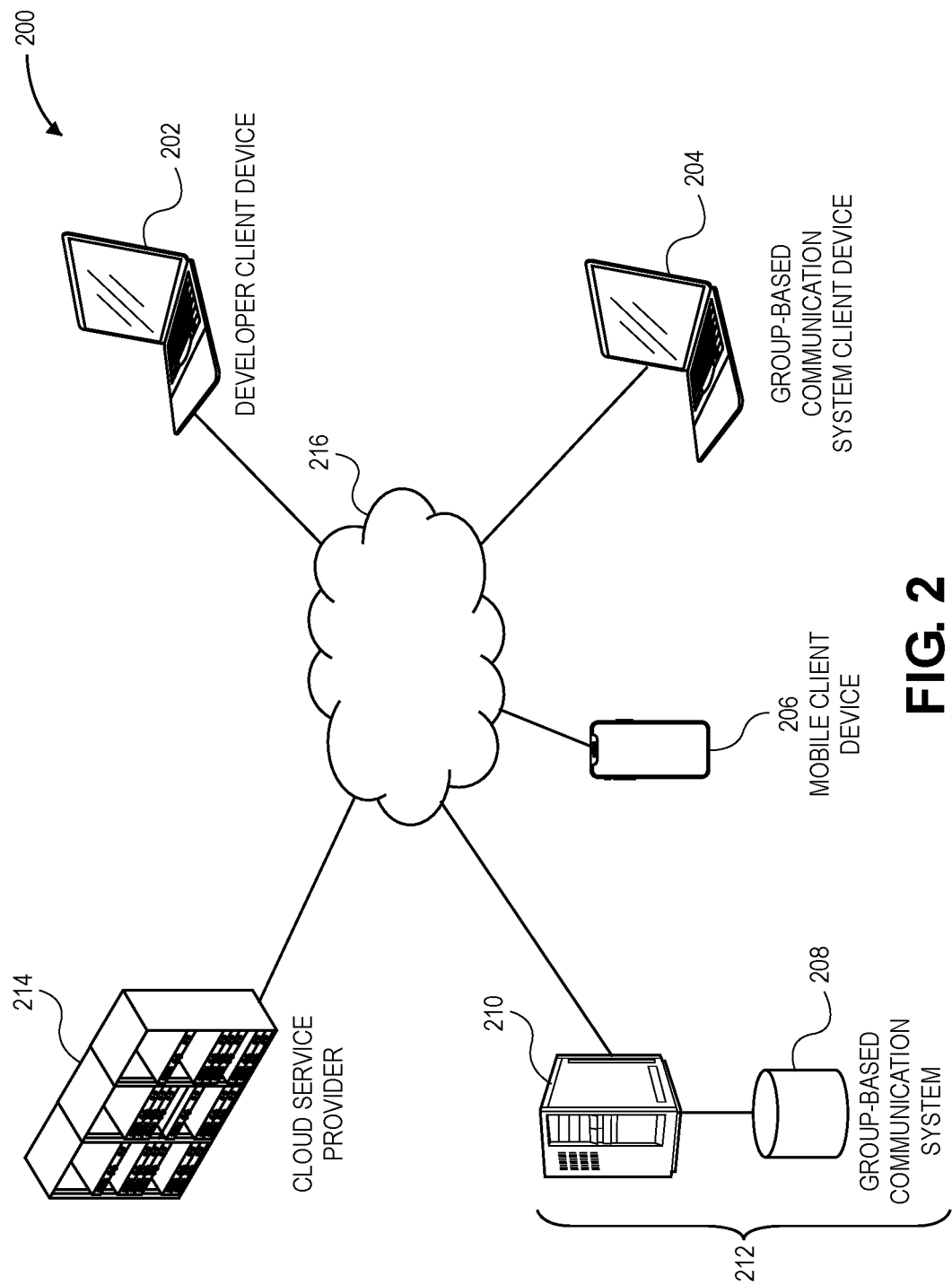
FIG. 2 depicts components of a system for carrying out embodiments of the invention.

Turning now to FIG. 2, an exemplary diagram illustrating components of a system for carrying out embodiments of the invention is depicted and referred to generally by reference numeral 200. System 200 provides a platform for building, deploying, running, monitoring, and maintaining event-based applications. System 200 includes any number of client devices such as group-based communication system client device 204, mobile client device 206, and developer client device 202. An individual user may connect to components of system 200 using a single client device or multiple client devices, either concurrently or sequentially. Similarly, in some embodiments, multiple users may share (concurrently or sequentially) a single client device to access the group-based communication system. As depicted in FIG. 2, client devices may be any form of computing device discussed above with respect to FIG. 1. In particular, a user may access components of system 200 using a desktop, a laptop, or a mobile device. Components of system 200 may be accessible via dedicated software of a particular client device or via a web browser associated with the client device. In some embodiments, developers and application hosting system administrators can access administrative functionality via any client device. In other embodiments, administrative functions can only be accessed from a limited subset of client devices (for example, only via developer client device 202). In some embodiments, group-based communication system 212 is a channel-based messaging platform that can host a multiplicity of group-based communication system servers and group-based communication data stores such as group-based communication system server 210 and group-based communication data store 208.

In some embodiments, group-based communication system 212 provides services in connection with group-based communication system server 210. Group-based communication system server 210 may be a dedicated server, a shared server, a virtual machine instance in a cloud computing environment, or any other form of computing device discussed above with respect to FIG. 1. Although a single group-based communication system server 210 is depicted, embodiments with multiple such group-based communication system servers are also contemplated so as to provide scale, redundancy and/or isolation between different instances of the group-based communication system. For example, a software development company may not wish to have its group-based communications system hosted on the same server as a competitor's group-based communication system for security reasons.

Cloud service provider 214 represents an on-demand cloud computing platform providing data storage and computing resources in the form of dedicated servers, shared servers, virtual machine instances in a cloud computing environment, or any other form of computing device discussed above with respect to FIG. 1. Cloud service provider 214 may provide software as a service (SaaS), infrastructure as a service (IaaS) or platform as a service services (PaaS), including serverless execution in an event-driven serverless execution environment. A serverless execution environment may enable the deployment of an application container that is built for a particular execution environment. Broadly, an application container is an isolated instance of a particular application including application code, application configuration resources, and certain associated libraries and application dependencies allowing rapid and independent deployment of that application.

Server 210 is communicatively coupled to client devices 202, 204, and 206 as well as cloud service provider 214 via network 216. Network 216 may be a local area network (LAN), wide-area network (WAN), virtual private network (VPN) or the Internet. Broadly speaking, any type of network for providing communication between the various components of system 200 is contemplated. Group-based communication system server 210 may provide web server functionality to enable web-based clients and non-web server functionality to enable clients using a dedicated app. Alternatively, both web-based clients and dedicated-app clients might both use a single web server, or the web server might be a gateway providing web-based access to the dedicated-app server. Other techniques for enabling communication among various types of client application are also contemplated.

Group-based communication system data store 208 is communicatively connected to group-based communication system server 210. As depicted, group-based communication system data store 208 is directly connected to group-based communication system server 210; however, any form of communicative connection (for example, network-attached storage (NAS), a network file system (NFS), or cloud-based storage) can be employed. Broadly speaking, group-based communication system data store 208 stores all of the durable information used by group-based communication system server 210. For example, group-based communication system data store 208 may store all of the messages with their associated channels, documents and images uploaded to particular channels, channel membership information, and/or user information. As previously discussed, multiple group-based communication system servers may be present in system 200. In such embodiments, each group-based communication system server may have its own copy of group-based communication system data store 208. Alternatively, multiple group-based communication system servers may share a single network-attached group-based communication system data store. Alternatively, or in addition, in any of these embodiments, data may be shared across multiple group-based communication system data stores.

Figure 3:
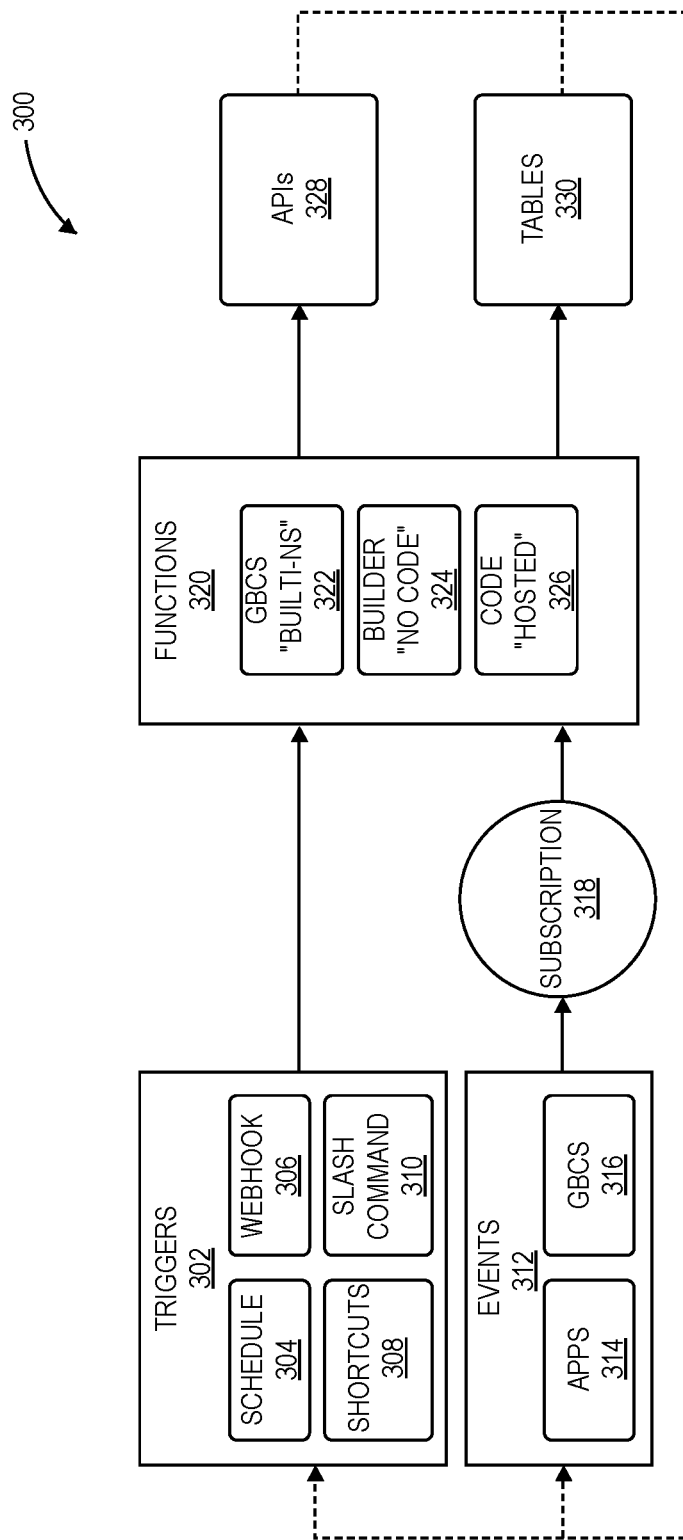
FIG. 3 depicts a block diagram for carrying out embodiments of the invention.

Turning now to FIG. 3, a block diagram for carrying out embodiments of the invention is depicted and referred to generally by reference numeral 300. In various embodiments, triggers 302 are configured to trigger execution of function 320. A trigger initiates application execution and may take the form of a schedule 304, a webhook 306, a shortcut 308, or a slash command 310. In some embodiments, schedule 304 operates like a timer so that a trigger may be scheduled to fire periodically. In some embodiments, an end user of an event-based application sets an arbitrary schedule for the firing of a trigger, such as once-an-hour or every day at 9:15 AM. Additionally, triggers 302 may take the form of webhook 306. Webhook 306 is a software component that listens at a webhook URL and port. In some embodiments, a trigger fires when an appropriate HTTP request is received at the webhook URL and port. In some embodiments, webhook 306 requires proper authentication such as by way of a bearer token. In some embodiments, a payload associated with a particular webhook invocation will contain information to be processed at the webhook prior to causing any trigger to be fired. In some embodiments, one of the triggers 302 will fire any time webhook 306 is invoked and some or all of the payload associated with a particular webhook invocation will be passed on to one or more of functions 320. In some other embodiments, triggering will be dependent on payload content.

Another source of one of triggers 302 is a shortcut in shortcuts 308 associated with a group-based communication system. In some embodiments, shortcuts 308 are global to a group-based communication system or specific to a group-based communication system channel. Global shortcuts are not specific to a group-based communication system channel or workspace. Global shortcuts may be initiated from a shortcuts button in a group-based communication message composer or from within a search interface associated with the group-based communication system client interface. Global shortcuts may trigger functions that are able to execute without the context of a particular group-based communication system message or group-based communication channel. By contrast, message- or channel-based shortcuts are specific to a group-based communication system message or channel and operate in the context of the particular group-based communication system message or group-based communication channel.

A further source of one of triggers 302 may be provided by way of slash commands 310. Slash commands 310 may serve as entry points for group-based communication system functions, integrations with external services, or group-based communication system message responses. In some embodiments, slash commands 310 may be entered by a user of a group-based communication system in order to trigger execution of particular application functionality. A particular slash command may be entered by a user of the group-based communication system directly into a user input component ordinarily used to input group-based communication system messages. In some embodiments, slash commands 310 are distinguishable from a group-based communication system message in that they are preceded by a forward slash ('/'). Slash commands may be followed by slash-command-line parameters which may be passed along to any group-based communication system function that is invoked in connection with the triggering of a group-based communication system function such as one of functions 320.

An additional source of triggers for a function is when an event (such as event 312) matches one or more conditions as predetermined in a subscription (such as subscription 318). Events 312 may be subscribed to by any number of subscriptions 318, and each subscription may specify different conditions and trigger a different function. In some embodiments, events are group-based communication system messages that are received in one or more group-based communication system channels. App events 314 may be group-based communication system messages with associated metadata that are created by an application in a group-based communication system channel. Events 312 may also be direct messages received by one or more group-based communication system users, which may be an actual user or a technical user, such as a bot. A bot is a technical user of a group-based communication system that is used to automate tasks. A bot may be controlled programmatically to perform various functions. A bot may monitor and help process group-based communication system channel activity as well as post messages in group-based communication system channels and react to members' in-channel activity. Bots may have names, profiles, profile photos associated with a group-based communication system. Bots may be referenced in group-based communication system messages and sent direct messages. Bots may be able to post messages and upload files as well as be invited or removed from both public and private channels in a group-based communication system.

Events 312 may also be any event associated with a group-based communication system. Such group-based communication system events 316 include events relating to the creation, modification, or deletion of a user account in a group-based communication system, events relating to messages in a group-based communication system channel, such as creating a message, editing or deleting a message or reacting to a message. Events 312 may also relate to creation, modification, or deletion of a group-based communication system channel or the membership of a channel. Events 312 may also relate to user profile modification or group creation, member maintenance, or group deletion.

As described above, subscription 318 indicates one or more conditions which, when matched by events, trigger a function. In some embodiments, a set of event subscriptions is maintained in connection with a group-based communication system such that when an event occurs, information regarding the event is matched against a set of subscriptions to determine which (if any) of functions 320 should be invoked. In some embodiments, the events to which a particular application may subscribe are governed by an authorization framework. In one embodiment, the event types matched against subscriptions are governed by OAuth permission scopes which may be maintained by an administrator of a particular group-based communication system.

Functions 320, which are triggered by triggers 302 and subscribed events 312 may be provided in various forms. First, there are group-based communication system "built-ins" 322, which are associated with the core functionality of a particular group-based communication system. Some examples include creating a group-based communication system user or channel. Next are builder "no code" functions 324 that may be developed by a user of a group-based communication system user in connection with a workflow builder user interface as described above. Finally, there are code "hosted" functions 326 which are implemented by way of group-based communication system applications that are developed as software code in connection with a software development environment.

These various types of functions 320 may in turn integrate with APIs 328. In some embodiments, APIs 328 are associated with third-party services that functions 320 employ to provide a custom integration between a particular third-party service and a group-based communication system. Examples of third-party service integrations include video conferencing, sales, marketing, customer service, project management, and engineering application integration. In such an example one of the triggers 302 could be a slash command 310 that is used to trigger a code "hosted" function 326, which makes an API call to a third-party video conferencing provider by way of one of the integrated APIs 328. As shown in FIG. 3 the APIs 328 may themselves also become a source of one or more triggers 302 or events 312. In this example, successful completion of a video conference could trigger a one of the functions 320 that sends a message initiating a further API call to the third-party video conference provider to download and archive a recording of the video conference and store it in a group-based communication system channel.

In addition to integrating with APIs 328, functions 320 may persist and access data in tables 330. In some embodiments tables 330 are implemented in connection with a database environment associated with a serverless execution environment in which a particular event-based application is executing. In one embodiment, tables 330 may be provided in connection with a relational database environment. In other embodiments, tables 330 are provided in connection with a database mechanism that does not employ relational database techniques. As shown in FIG. 3, in some embodiments, reading or writing certain data to one or more of tables 330, or data in table matching predefined conditions is itself a source of one or more triggers 302 or events 312. For example, if tables 330 are used to maintain ticketing tata in an incident-management system, then a count of open tickets exceeding a predetermined threshold may trigger a message being posted in an incident-management channel in the group-based communication system.

Figure 4:
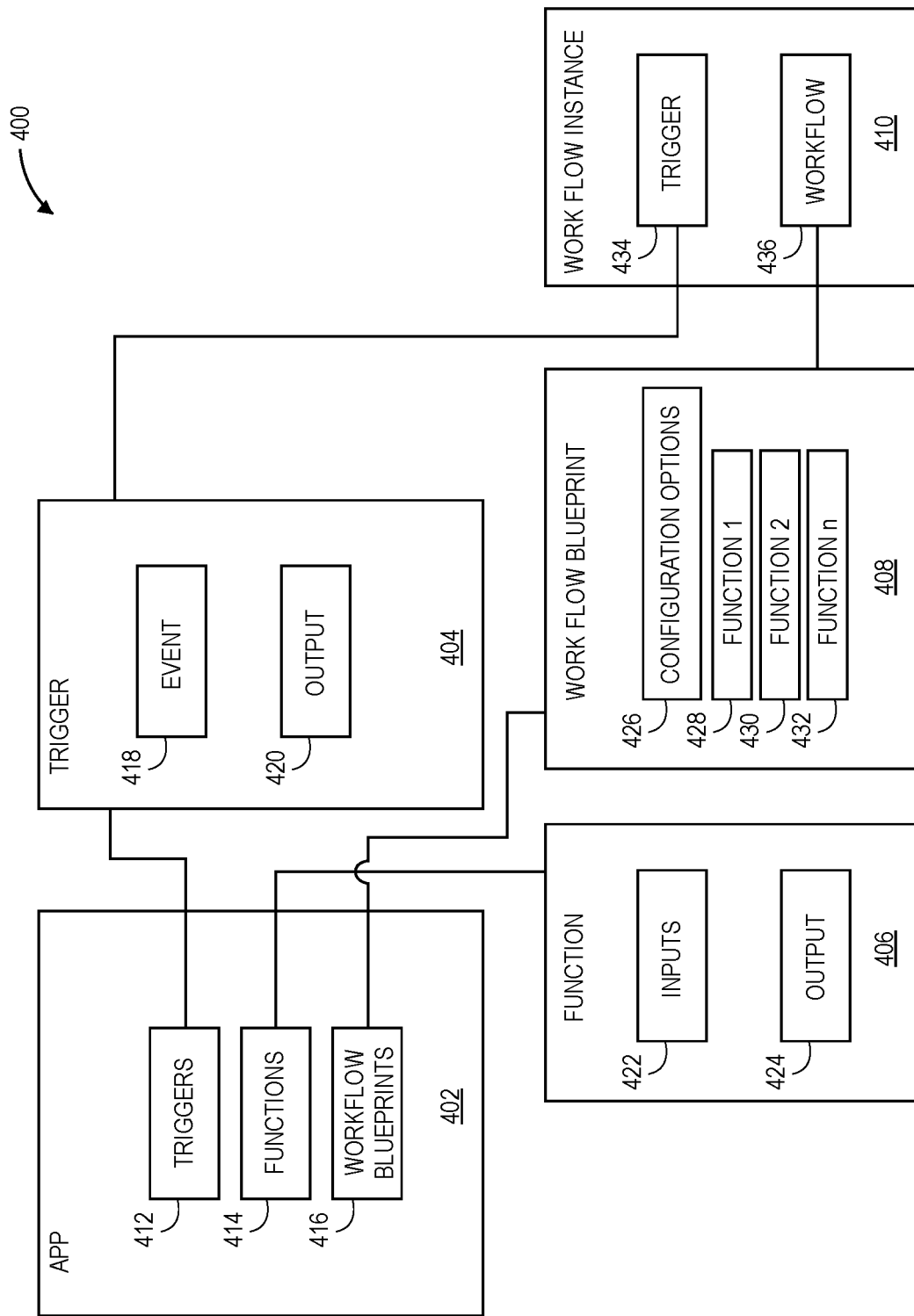
FIG. 4 depicts an exemplary block diagram for illustrating the operation of a system in accordance with one embodiment of the invention.

Turning now to FIG. 4, an exemplary block diagram is depicted for illustrating the operation of a system in accordance with one embodiment of the invention and referred to generally by reference numeral 400. In various embodiments, a group-based communication system enables a configuring user to customize a workflow in the group-based communication system directly from a group-based communication system client interface itself, rather than employing a separate workflow builder user interface. In some embodiments, application (app) 402 is developed by a third-party partner of an operator of a group-based communication system. App 402 may contain various components such as triggers 412, functions 414, and workflow blueprints 416.

A configuring user may use trigger 404 directly as it is provided by the third-party partner as it is delivered in the set of triggers 412. As described above in connection with FIG. 3, a particular trigger may be configured to initiate execution of group-based communication system function. A trigger may also initiate execution of workflow instance 410 as explained below. In general, a trigger initiates application execution and may take on various forms as explained above in connection with FIG. 3.

As noted above, functions 414 expose application logic that can be reused. Broadly speaking, functions 414 define inputs and output and include application logic to generate the output from the inputs. A particular function 406 defines inputs 422 and generates output 424. In some embodiments, functions also generate side effects such as posting a message to the group-based communication system, storing or retrieving data, or executing an application external to the group-based communication system. In some embodiments, function 406 could be implemented as a particular workflow instance, such as workflow instance 410. Function 406 may be provided by the third-party partner or may be developed by a user or operator of a group-based communication system. Function 406 may be published to a workspace associated with the group-based communication system. As explained below in connection with FIG. 6D, function 406 may be exposed to workflow building users from a published application, such as app 402.

A particular workflow blueprint 408 may be delivered in the set of workflow blueprints 416 by the third-party partner who provides app 402. Alternatively, any authorized user of a group-based communication system may compose a workflow blueprint. As another alternative, an existing workflow may be converted to a workflow blueprint by removing the particular functions and configuration options while leaving the skeleton in place to be customized to create other, similar, workflows. Workflow blueprint 408 has configuration options 426, which may include triggers, event variables, and workflow steps. Workflow blueprint 408 may also contain an arbitrary number of functions such as functions 428, 430, and 432.

A particular workflow instance, such as workflow instance 410, may be instantiated by any authorized user of a group-based communication system. In some embodiments, workflow instance 410 may be installed into a channel for all authorized channel members to access.

Alternatively, workflow instance 410 may be installed into a channel intended only for specifically authorized users to access. In yet another alternative, a workflow instance may be installed specifically for the use of one or more specific users. An installed workflow instance may have one or more triggers such as trigger 434 that is used to initiate execution of workflow 436 within workflow instance 410.

In some embodiments, configuring users are presented with an opportunity to click on (or tap on or otherwise select) existing user interface components such as messages to add and/or customize group-based communication system workflow exposed by app 402. For example, this may include building, installing, and publishing workflows and functions. By navigating the user interface directly, configuring users are able to discover opportunities for customizing workflow based on messages and events associated with the group-based communication system. By virtue of discovering possible customizations directly from components in the user interface, a technical improvement is realized by allowing workflow automations to be more efficiently designed.

Customizing a workflow by discovering possible functionality by navigating a user interface directly provides an improved user experience. Moreover, operators of a group-based communication system can gather statistical information regarding what workflow functionality is useful to users by capturing how users discover functionality in group-based communication system channels. It may be desirable for configuring users to create workflows based on activities stemming from a scheduled trigger, an incoming webhook, or an emoji reaction. A configuring user may select one of these activities) for example, by right-clicking or long pressing it) and build a workflow around the activity directly. Similarly, a configuring user may wish to build workflow around side-effects from applications such as scheduled postings, external triggers, emoji reactions, and other event triggers or notifications.

In some embodiments, workflows created directly in the client interface by a configuring user may be able to be further modified by the configuring user (or other authorized users) in a specialized workflow builder user interface after they have been created in the client interface. For example, in some embodiments, the configuring user has the capability to add collaborators in the workflow builder user interface or perform other tasks such as deleting or renaming workflows and workflow blueprints. In some embodiments, workflows and workflow blueprints are globally available (i.e., accessible in all channels in a workspace). In some embodiments the workflows and workflow blueprints are also searchable through the group-based communication system.

In some embodiments, machine learning may be employed to identify common patterns that could be automated by way of a workflow. For example, if a user reviews a predetermined number of potential employment candidate resumes with a "thumbs up" emoji, the group-based communication system may suggest adding a workflow around the use of this emoji to approve resumes and attaching the workflow to one or more functions associated with hiring processes within a particular organization. Another example is identifying a channel type (based on, for example, the channel name, members, or content) and suggesting setting up relevant actions appropriate to a sales channel, project channel, team channel, or incident channel. Yet another example relates to a personal productivity workflow, which updates a group-based communication system user's status to show when the user is online, on their lunch break, and when the user is done for the day. Workflows may automatically set a "do not disturb" status for the user when certain conditions are met as well as changing the user's active and/or away status. As a further example of how workflows may be triggered based on actions by other workflows, such a status change to "lunch break" may also trigger another workflow to post a message to a dedicated lunchtime meetup channel.

Figure 5:
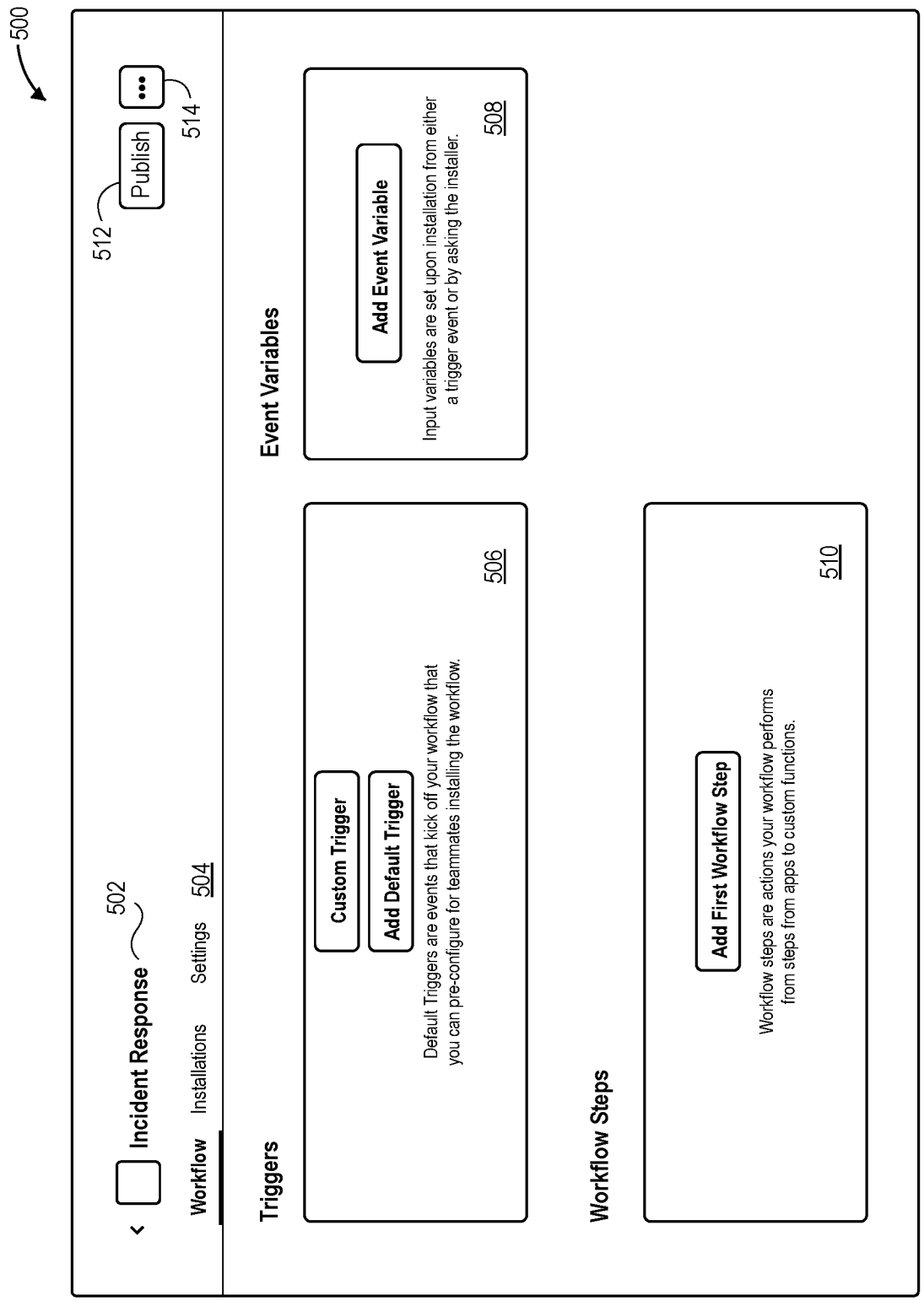
FIG. 5 depicts an unpopulated user interface component for designing a workflow or workflow blueprint in connection with certain embodiments of the invention.

Turning now to FIG. 5, an unpopulated user interface component is depicted for designing a workflow or workflow blueprint in connection with certain embodiments of the invention and referred to generally by reference numeral 500. User interface component 500 provides a mechanism for designing and publishing a workflow in connection with a user interface component as discovered by interacting directly with a group-based communication system client interface. In this example, to bring up user interface component 500, a configuring user actuated a user interface control associated with an event message relating to an incident response. This is indicated by user interface element 502 entitled "Incident Response." In some embodiments, the configuring user may alter the title by double clicking user interface element 502 or otherwise providing a gesture or other indication that the title should be renamed. Through use of tab set 504, user interface component 500 may provide other screens such as screens relating to installations of the workflow and workflow settings, for example. The configuring user may add triggers or modify via triggers user interface control 506, as described below with respect to FIGS. 6A and 6B. The configuring user may add event variables via event variables user interface control 508, as described below with respect to FIG. 6C. The configuring user may also add workflow steps via workflow steps user interface control 510, as described below with respect to FIG. 6D. Finally, once the workflow is complete, it may be published via publish button 512. Further workflow menu options may be provided in connection with three-dot menu 514.

Turning now to FIG. 6A, an exemplary modal dialog box 600 is depicted for adding a supported trigger to a workflow in accordance with embodiments of the invention. Modal dialog box 600 provides a mechanism for adding supported triggers to the workflow. In some embodiments, dropdown 602 is pre-populated with a trigger provider. Alternatively, a configuring user may type the name of a trigger provider directly into a text input associated with dropdown 602. In some embodiments, when inputting text associated with a provider into dropdown 602, autocomplete functionality may provide potential trigger providers based on discovery context under which the user interface control was actuated. In the depicted example, an organization named "Visualization Co." that provides log data and alert visualization services is pre-populated in dropdown 602 based on the context of opening the modal dialog box 600. The context may be provided based on the user interface control used to actuate the workflow design. For example, in the depicted interface, the configuring user activated the workflow design process via a user interface control associated with a group-based communication system message including pre-built visualization charts from Visualization Co. Alternatively, pre-population may be driven by context from a workflow blueprint.

In some embodiments, dropdown 604 is pre-populated with a set of events provided by (or otherwise associated with) the provider identified in connection with dropdown 602. In this example, the event associated with the supported trigger is a "New Alert" event from the provider Visualization Co. In this case, the trigger is generated when certain thresholds corresponding to the log data processed by Visualization Co. are exceeded. Other events may be selected from dropdown 604. In some embodiments, an event name not pre-populated in a dropdown list associated with dropdown 604 may be manually typed into a text input associated with dropdown 604 for example in anticipation of enhancement of the external event source from Visualization Co. Until such enhancement occurs, no such event will be received from the provider. In some embodiments, only known events that are pre-populated in dropdown 604 may be selected to avoid a situation under which an event is inadvertently defined in the trigger that will never occur.

Optional dropdown 606 is provided to enable the configuring user to specify an account with the third-party event provider. For example, when the trigger is internal to (or otherwise provided by) the group-based communication system, no account may be provided. In some embodiments, dropdown 606 is pre-populated with an account which the user has previously authenticated in the group-based communication system client interface session. Authentication state may be maintained in connection with browser cookies or other state preserved in connection with the group-based communication system client interface session. In some embodiments, the configuring user may override the third-party provider account if, for example, multiple accounts exist and the trigger should originate from an account other than the account that was previously authenticated in the group-based communication system client interface session.

Optional user interface component 608 may be used to assign variables associated with the trigger to event data that is provided to the workflow. User interface component 608 may provide pre-populated assignments based on context associated with the provider and the actuated user interface control. Such context may also be derived from an associated workflow blueprint. In the depicted example, event data defining a rule name for the workflow is assigned to a variable entitled "Title" which is provided in the trigger from provider Visualization Co. User interface component 608 may also have a button to add additional variables to the supported trigger configuration.

Turning now to FIG. 6B, an exemplary modal dialog box 630 is depicted for modifying a supported trigger to a workflow in accordance with embodiments of the invention. Modal dialog box 630 provides a mechanism for defining data filters associated with a particular trigger from a third-party event provider. User interface control 632 may be selected to expand a definition of a third-party event provider, the nature of an expected event, and variable assignments associated with the event as described in connection with FIG. 6A above.

In some embodiments, user interface component 634 allows input and configuration of conditional filters associated with a supported trigger. User interface component 634 may provide pre-populated conditional filters based on context associated with the provider and the actuated user interface control. Such context may also be derived from an associated workflow blueprint. In the depicted example, new alerts from the third-party trigger provider will only cause the trigger to fire when a priority associated with the new event is set to "High."

Figure 6C:
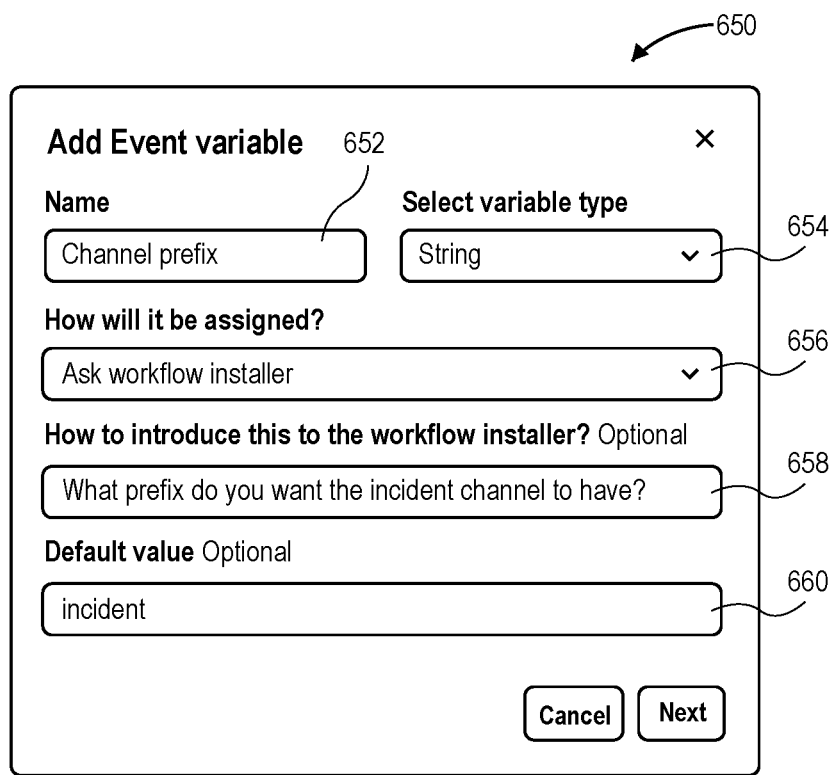
FIG. 6C depicts an exemplary modal dialog box for adding an event input variable to a workflow or workflow blueprint in accordance with embodiments of the invention.

Turning now to FIG. 6C, an exemplary modal dialog box 650 is depicted for adding an event input variable to a workflow or a workflow blueprint in accordance with embodiments of the invention. In some embodiments, values associated with event variables may be assigned at workflow runtime based on event variable assignment definitions associated with workflows or workflow blueprints. Text input 652 may be used to define a variable name. In the illustrated example, the name of the assigned variable is the channel prefix of the group-based communication system channel from which the event originated. Dropdown 654 may be employed to specify or override a variable data type associated with the variable designated in text input 652. Dropdown 656 allows the configuring user to specify how a particular variable will be assigned at installation time of the workflow. In some embodiments, event variables may have default assignments, and in the illustrated example, variable assignments may be assigned to workflow inputs at installation time, by specifying the option of asking the workflow installer to define which input should be mapped to a particular event variable at install time of the workflow.

An optional variable description may be provided in text input 658. Modal dialog box 650 may provide pre-populated variable descriptions based on context associated with the event variable provided. Such context may also be derived from an associated workflow blueprint. In the depicted example, the description is tied to the variable name of "Channel prefix" such that the user that installs the associated workflow will be prompted to provide a particular prefix for the group-based communication system channel from which the associated event originates. An optional default value for the variable may be provided in text input 660.

Figure 6D:
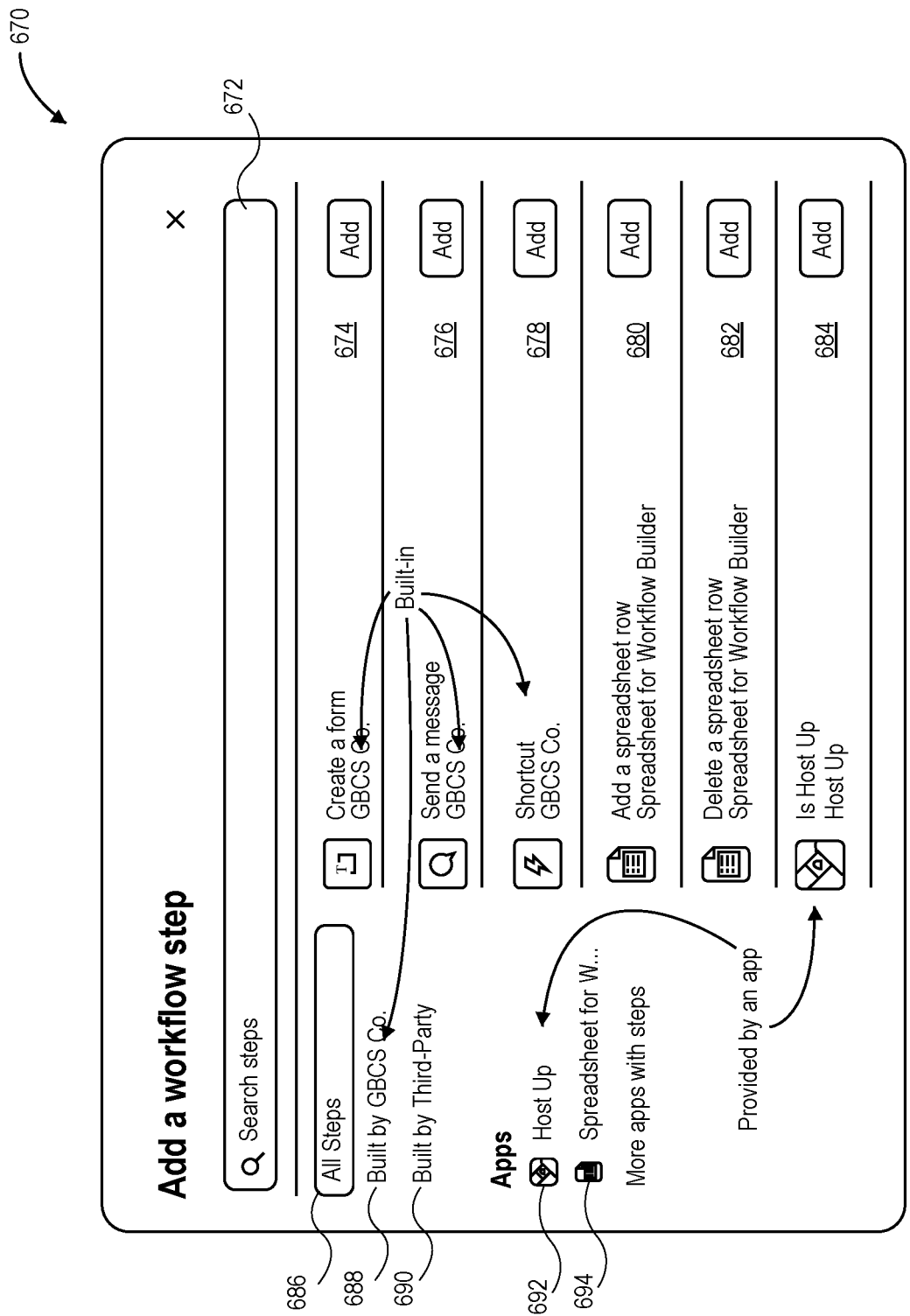
FIG. 6D depicts an exemplary modal dialog box for adding a workflow step to a workflow in accordance with embodiments of the invention.

Turning now to FIG. 6D, an exemplary modal dialog box 670 is depicted for adding a workflow step in certain embodiments of the invention. In various embodiments, a corpus of usable workflow steps is made available to a workflow-building user. In one embodiment, search field 672 is provided so that the workflow-building user may search for a particular workflow step by name or by other characteristic of the workflow step which the workflow-building user needs to perform a particular step within a workflow. The workflow-building user may search for a workflow step in terms of functionality or description of the workflow step, on the basis of an author of the workflow step, or a date range associated with the creation or publishing of the particular workflow step.

In some embodiments, one or more of the listed available workflow steps may be added to a workflow by clicking an "Add" button associated with the respective workflow step. As shown in the example of FIG. 6D, various workflow steps may be provided. Workflow step 674 is a step that performs the function of creating a form, which will be displayed to an end user of a group-based communication system and made interactive for use by the end user. Further configuration of workflow step (not shown) may be performed by the workflow-building user once the workflow-building user has clicked to add workflow step 674 to the workflow being built. Workflow step 676 is a step that performs the function of sending a message within the group-based communication system. Workflow step 678 is a shortcut for implementing a group-based communication system shortcut, which is a step that will execute the underlying group-based communication system function associated with the shortcut as configured in the group-based communication system. Workflow steps 674, 676, and 678 are shown to be from "GBCS Co." which, in the illustrated embodiment, is an operator of a particular group-based communication system. These workflow steps are said to be built-in because they are part of the core functionality of the group-based communication system.

In some embodiments, to aid the workflow-building user in filtering available workflow steps, filter criteria are provided. Such filter criteria include empty filter criterion 686 which provides a list of all steps without limitation as indicated. Filter criteria also include built-in filter criterion 688, which limits the display to built-in workflow steps that are provided by GBCS Co. In this embodiment, the filter criteria also include vendor-specific filter criterion 690, which will limit the display to workflow steps that are provided by a third-party application, such as workflow steps 680 and 682, which provide the functionality of adding and deleting a spreadsheet row based on configuration of the workflow step and any current state of the workflow up to that point.

Workflow step 684 is also a step that is exposed by a hosted group-based communication system application that implements and exposes group-based communication system functions within the workflow builder user interface illustrated in FIG. 6D. Workflow step 684 is entitled "Is Host Up" and is associated with the group-based application entitled "Host Up." In various embodiments, the workflow-building user may interact with user interface component 670 to filter displayed workflow steps to only those provided by a particular third-party application such application identifiers 692 and 694, which correspond to third-party applications "Spreadsheet for Workflow Builder" and "Host Up" respectively.

Figure 7:
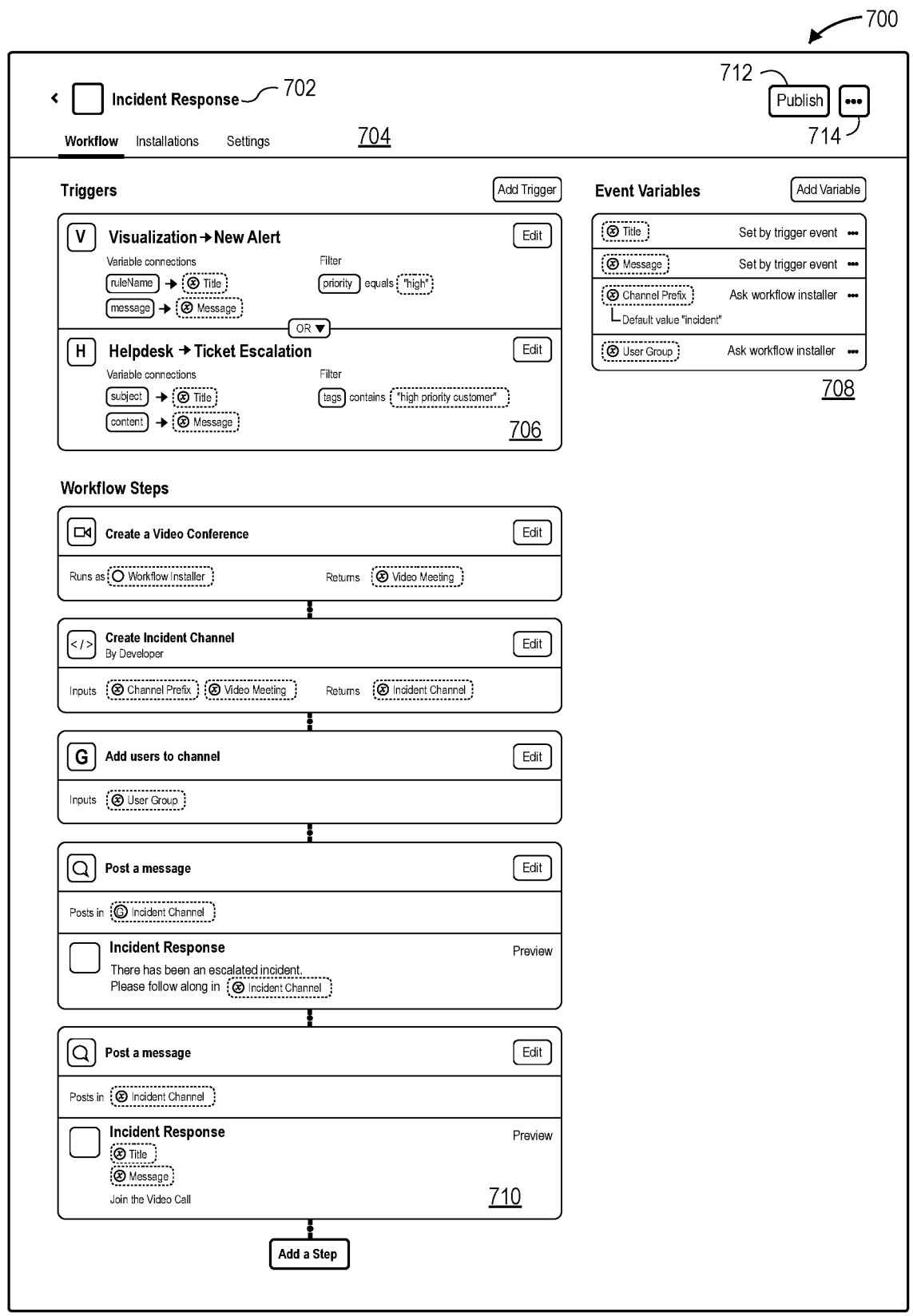
FIG. 7 depicts an exemplary populated user interface component for designing a workflow or workflow in connection with certain embodiments of the invention.

Turning now to FIG. 7, an exemplary populated user interface component is depicted for designing a workflow or workflow blueprint in connection with certain embodiments of the invention and referred to generally by reference numeral 700. For example, FIG. 5 may depict the unpopulated user interface component of FIG. 5 after going through the steps depicted in FIGS. 6A-6D to populate it. Similar to user interface component of FIG. 5, user interface component 700 provides a mechanism for further designing and publishing a workflow or workflow blueprint in connection with a user interface component as discovered by interacting directly with a group-based communication system client interface. For example user interface element 702 entitled "Incident Response" corresponds to user interface element 502 and, similar to user interface element 502 of FIG. 5, the configuring user may alter the title by double clicking user interface element 702 or otherwise providing a gesture or other indication that the title should be renamed. Through use of tab set 704, user interface component 700 may provide other screens such as screens relating to installations of the workflow and workflow settings.

The configuring user may add triggers via triggers user interface control 706. In some embodiments, selecting the "add trigger" button of triggers user interface control 706 causes modal dialog box 630 to be displayed for the configuring user to configure the triggers for the workflow or blueprint. In the depicted example, multiple triggers are defined in the alternative such that either trigger will cause the workflow to execute. In the depicted example, an alert from either of Visualization or Helpdesk will cause workflow execution because the trigger conditional definition is set to "OR." By way of user interface control 706, the configuring user may configure the triggers to be dependent by changing the setting to "AND," such that both triggers will have to occur in order for the workflow to be executed. In some embodiments, by selecting variables or filter, associated underlying variables or filters may be modified as described in connection with FIGS. 6A and 6B.

The configuring user may add event variables via event variables user interface control 708. In some embodiments, selecting the "add variable" button of event variables user interface control 708 causes modal dialog box 650 to be displayed for the configuring user to configure the event variables for the workflow or blueprint. In the depicted example, multiple event variables are defined with associated assignments. In some embodiments selecting any of the defined variables will allow the configuring user to modify an event variable configuration as described above in connection with FIG. 6C. In the depicted example, event variables associated with events from either of Visualization or Helpdesk will be assigned to workflow inputs in the event of a workflow trigger.

The configuring user may add workflow steps via workflow steps user interface control 710. In some embodiments, selecting the "add a step" button of workflow steps user interface control 710 causes modal dialog box 670 to be displayed for the configuring user to configure the workflow steps for the workflow or blueprint. In the depicted example, multiple workflow steps are defined with workflow step definitions. In some embodiments selecting any of the workflow steps will allow the configuring user to modify a workflow step as described above in connection with FIG. 6D. The configuring user may also add an additional workflow step. Finally, once the workflow is complete, it may be published via publish button 712. Further workflow menu options may be provided in connection with three-dot menu 714.

Figure 8:
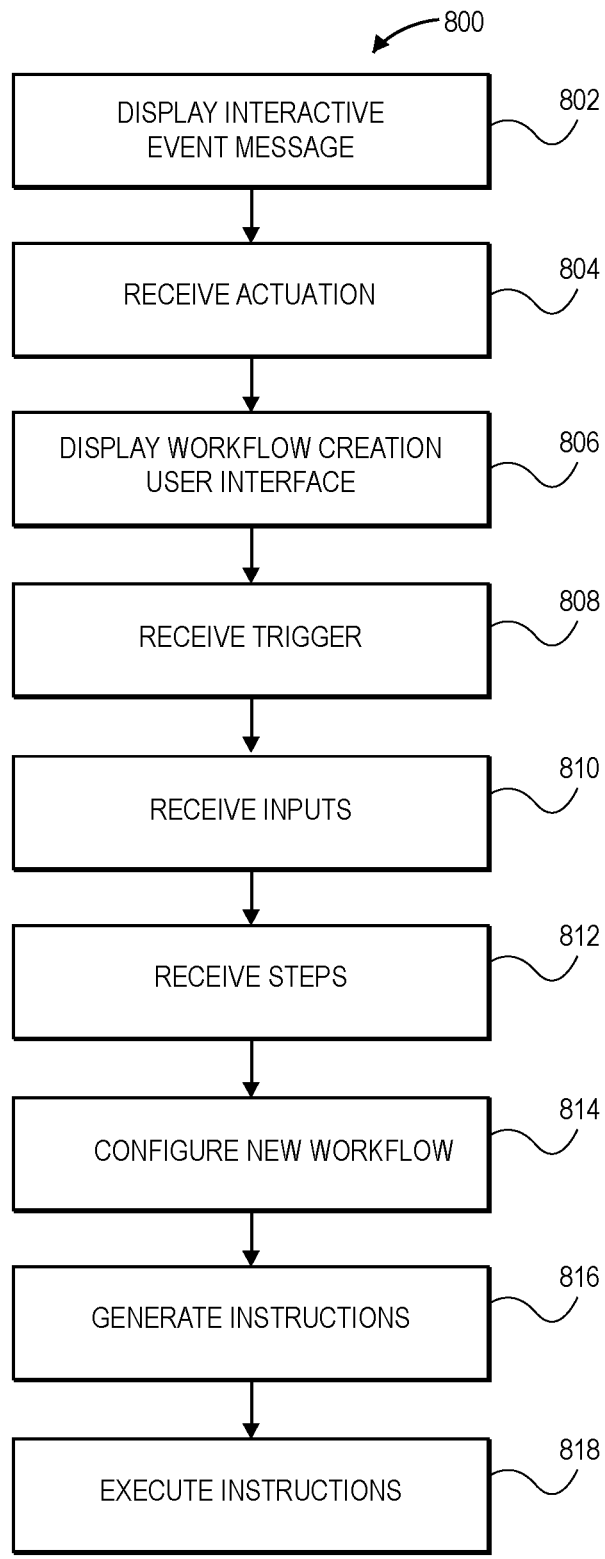
FIG. 8 depicts an exemplary flow chart for illustrating the operation of a method in accordance with embodiments of the invention.

Turning now to FIG. 8, an exemplary flow chart 800 is depicted for illustrating the operation of a method in accordance with embodiments of the invention. In various embodiments, a user of a group-based communication system may interact with a group-based communication system client interface by sending and receiving messages in one or more group-based communication system channels. In some cases, such sent and received messages are from human user to human user or groups of human users. In other cases, messages in a group-based communication channel are notifications that have machine-user interactive features.

Optionally, at step 802, an event message is displayed in a group-based communication system message channel. In some embodiments, the event message is a message posted by a user. In other embodiments, the event message is a reaction (such as a reactji) by a first user to a message posted by a second user. In still other embodiments, the displayed event message is representative of an instance of a programmatic event in the group-based communication system. In some such embodiments, the event message is not intended for user display and is instead provided via a data undercurrent of the group-based communication channel that is normally not displayed to users, but can be toggled when creating workflows. Broadly, a programmatic event may be an event associated with an API call received from an external system or an event programmatically derived by an internal group-based communication system workflow or other function. For example, the programmatic event may be a message posted by a third-party app integrated with the group-based communication system.

At step 804, an actuation is received from a configuring user by way of an actuating user interface control associated with the event message. In some embodiments, the actuating user interface control is a button that may be activated by mouse click or stylus tap. For example, a user may be able to right click on the event message and select an appropriate command from a context menu. In a mobile scenario, buttons or other selectable user interface components may be tapped, swiped or otherwise selected by means of a mobile-type interactive gesture. In some other embodiments, separate button controls are not necessary as an existing part of the group-based communication system client interface may be utilized in such a way that the existing component becomes a user interface control that can be actuated. For example, a configuring user might right-click or long tap a particular word or phrase in a message to actuate the word or phrase in order to discover opportunities to design workflow around that particular word or phrase. Alternatively, a configuring user could select a cursor control from a cursor control menu and any component in the client interface that is moused-over or otherwise activated provides an indication regarding opportunities to design workflow around the respective user interface component. In yet another alternative, a three-dot menu, hamburger menu, or equivalent could be provided that when activated provides a list or other drop-down that provides workflow customization options based on content currently displayed in the group-based communication system client interface.

At step 806, the group-based communication system client displays a workflow creation user interface. The workflow creation user interface provides a mechanism for designing and publishing a workflow in connection with a user interface component as discovered by interacting directly with a group-based communication system client interface. For example, the workflow creation and configuration interface described above with respect to FIG. 5 may be displayed.

At step 808, configuration of triggers for the workflow is received via an associated trigger-input user interface component. The trigger-input user interface may provide pre-populated assignments based on context associated with the provider and the actuated user interface control. Such context may also be derived from an associated workflow blueprint. The trigger-input user interface component may also have a button to add additional variables to the supported trigger configuration. The trigger-input user interface component may also provide a mechanism for modifying a supported trigger to a workflow by way of an associated modal dialog box. In some embodiments, the trigger-input user interface control may be selected to expand a definition of a third-party event provider, the nature of an expected event, and variable assignments associated with the event as described in connection with FIG. 6A above.

At step 810, configuration of inputs for the workflow is received including values associated with event variables that may be assigned at workflow runtime based on event variable assignment definitions associated with workflows or workflow blueprints. An associated text input within a modal dialog box may receive a variable name definition. An associated dropdown input may be employed to specify or override a variable data type associated with the variable designated in the variable name text input. A dropdown interface allows the configuring user to specify how a particular variable will be assigned at installation time of the workflow. In some embodiments, event variables may be assigned default values.

At step 812, workflow steps are received when the configuring user provides an input to such as clicking an "Add" button associated with a workflow step. As shown in the example of FIG. 6D above, various workflow steps may be provided. Broadly speaking, any number of workflow steps may be added to a workflow. Earlier workflow steps may provide inputs or event variables useable by later workflow steps in the workflow.

At step 814, the group-based communication system configures the newly created and configured workflow. In some embodiments, the configured workflow may be instantiated as a group-based communication system function that itself can be called by other functions and workflows. In some embodiments, the workflow is configured to be available in a particular group-based communication channel. In alternative embodiments, the workflow may be provided for access to a specific group-based communication system user.

At step 816, computer executable instructions associated with the configured workflow are generated. For example, compiled or interpreted computer-executable instructions corresponding to the logic designated by the user during earlier steps may be generated and associated with the workflow in order to implement the logic in the group-based communication system. These instructions may be packaged into an executable container for deployment and deployed at any of the systems described above with respect to FIG. 2.

Finally, at step 818 workflow instructions are executed in response to a trigger associated with a corresponding event. For example, if the trigger designated by the user at step 808 is received, one or more event variables associated with the trigger may be mapped to the corresponding input variables for the workflow, and passed to a newly executing instance of the computer-executable instructions generated at step 816. In various embodiment, the workflow instructions may be executed on a group-based communication system server, a client computing device, or a third-party application server. In some embodiments, one or more actions performed by the workflow instructions may cause side effects to be performed, as described above. For example, one or more messages may be posted in a channel of the group-based communication system. As described above, this message may in turn cause additional workflows to be executed, either directly or as a result of user interactions with the posted messages.

Figure 9:
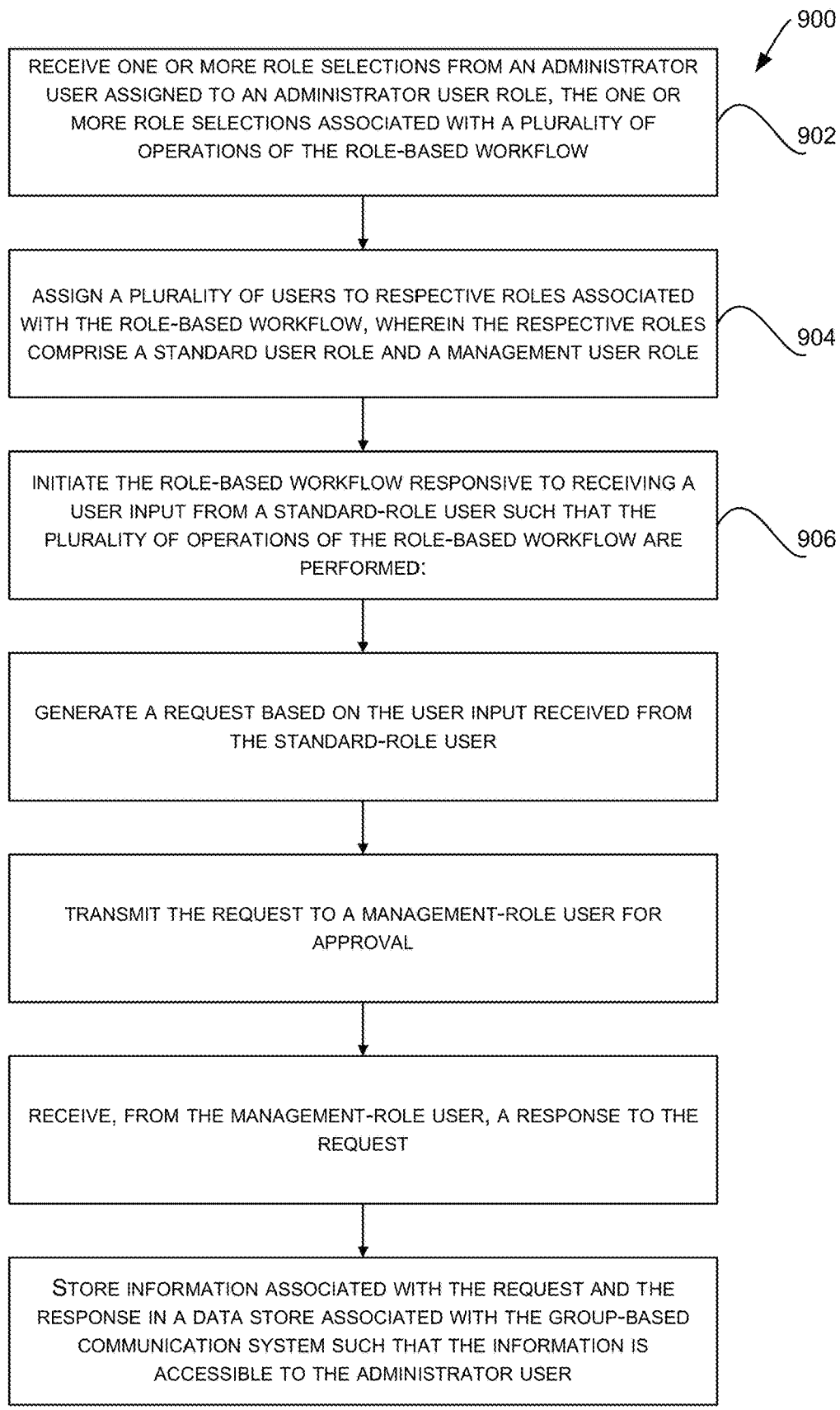
FIG. 9 depicts an exemplary flow chart for illustrating the operation of a method in accordance with embodiments of the invention.

Turning now to FIG. 9, an exemplary flow chart 900 is depicted for illustrating the operation of a method in accordance with embodiments of the invention. Step 902 includes receiving one or more role selections from an administrator user assigned to an administrator user role within the group-based communication system. In embodiments, the one or more role selections may be associated with a plurality of operations of the role-based workflow.

Step 904 includes assigning a plurality of users of the group-based communication system to respective roles associated with the role-based workflow. In embodiments, the respective roles associated with the role-based workflow may be based on the one or more role selections from the administrator user and comprise a standard user role and a management user role.

Step 906 includes initiating the role-based workflow responsive to receiving a user input from a standard-role user such that the plurality of operations of the role-based workflow are performed. In embodiments, the plurality of operations of the role-based workflow include: generating a request based on the user input received from the standard-role user; transmitting the request to a management-role user for approval; receiving, from the management-role user, a response to the request; storing information associated with the request and the response in a data store associated with the group-based communication system such that the information is accessible to the administrator user.

The invention claimed is:
1. One or more non-transitory computer-readable media storing computer-executable instructions that, when executed by at least one processor, perform a method for providing a role-based workflow in a group-based communication system, the method comprising:

receiving one or more role selections from an administrator user assigned to an administrator user role within the group-based communication system, the one or more role selections associated with a plurality of operations of the role-based workflow;

assigning a plurality of users of the group-based communication system to respective roles associated with the role-based workflow based on the one or more role selections from the administrator user, wherein the respective roles associated with the role-based workflow comprise a standard user role and a management user role; and initiating the role-based workflow responsive to receiving a user input from a standard-role user such that the plurality of operations of the role-based workflow are performed, wherein the plurality of operations of the role-based workflow include:

generating a request based on the user input received from the standard-role user;

generating a subsequent request based on a subsequent user input received from a subsequent user assigned to the standard user role;

adding the request and the subsequent request to a request queue;

transmitting the request queue to a management-role user for approval of one or more requests included in the request queue;

receiving, from the management-role user, one or more responses to the one or more requests included in the request queue; and storing information associated with the one or more requests included in the request queue and the one or more responses in a data store associated with the group-based communication system such that the information is accessible to the administrator user.

2. The one or more non-transitory computer-readable media of claim 1, wherein the plurality of operations of the role-based workflow are based on a pre-existing workflow.

3. The one or more non-transitory computer-readable media of claim 1, wherein the one or more responses received from the management-role user comprise one or more approvals of the one or more requests included in the request queue.

4. The one or more non-transitory computer-readable media of claim 3, the method further comprising:

responsive to receiving the one or more approvals of the one or more requests included in the request queue, transmitting the request queue to a subsequent user assigned to the management user role for further approval of the one or more requests included in the request queue;

receiving one or more subsequent approvals of the one or more requests included in the request queue from the subsequent user assigned to the management user role; and responsive to receiving the one or more subsequent approvals of the one or more requests included in the request queue, performing one or more actions within the group-based communication system based on the one or more of requests included in the request queue.

5. The one or more non-transitory computer-readable media of claim 1, wherein the one or more responses received from the management-role user comprise one or more denials of the one or more requests included in the request queue.

6. The one or more non-transitory computer-readable media of claim 5, the method further comprising:

responsive to receiving the one or more denials of the one or more requests included in the request queue, notifying one or more of the standard-role user and the subsequent user assigned to the standard user role of denial.

7. The one or more non-transitory computer-readable media of claim 1, the method further comprising:

receiving, from the administrator user, an access request to increase accessibility of the role-based workflow across an organization associated with the administrator user; and adjusting the accessibility of the role-based workflow within the group-based communication system such that users of the organization have access to the role-based workflow.

8. A method for providing a role-based workflow in a group-based communication system, the method comprising:

receiving one or more role selections from an administrator user assigned to an administrator user role within the group-based communication system, the one or more role selections associated with a plurality of operations of the role-based workflow;

assigning a plurality of users of the group-based communication system to respective roles associated with the role-based workflow based on the one or more role selections from the administrator user, wherein the respective roles associated with the role-based workflow comprise a standard user role and a management user role; and initiating the role-based workflow responsive to receiving a user input from a standard-role user such that the plurality of operations of the role-based workflow are performed, wherein the plurality of operations of the role-based workflow include:

generating a request based on the user input received from the standard-role user;

generating a subsequent request based on a subsequent user input received from a subsequent user assigned to the standard user role;

adding the request and the subsequent request to a request queue;

transmitting the request queue to a management-role user for approval of one or more requests included in the request queue;

receiving, from the management-role user, one or more responses to the one or more requests included in the request queue; and storing information associated with the one or more requests included in the request queue and the one or more responses in a data store associated with the group-based communication system such that the information is accessible to the administrator user.

9. The method of claim 8, wherein the plurality of operations of the role-based workflow are based on a pre-existing workflow.

10. The method of claim 8, wherein the one or more responses received from the management-role user comprise one or more approvals of the one or more requests included in the request queue.

11. The method of claim 10, further comprising:

responsive to receiving the one or more approvals of the one or more requests included in the request queue, transmitting the request queue to a subsequent user assigned to the management user role for further approval of the one or more requests included in the request queue;

receiving one or more subsequent approvals of the one or more requests included in the request queue from the subsequent user assigned to the management user role; and responsive to receiving the one or more subsequent approvals of the one or more requests included in the request queue, performing one or more actions within the group-based communication system based on the one or more requests included in the request queue.

12. The method of claim 8, wherein the one or more responses received from the management-role user comprise one or more denials of the one or more requests included in the request queue.

13. The method of claim 12, further comprising:

responsive to receiving the one or more denials of the one or more requests included in the request queue, notifying one or more of the standard-role user and the subsequent user assigned to the standard user role of denial.

14. The method of claim 8, further comprising:

receiving, from the administrator user, an access request to increase accessibility of the role-based workflow across an organization associated with the administrator user; and adjusting the accessibility of the role-based workflow within the group-based communication system such that users of the organization have access to the role-based workflow.

15. A system comprising:

at least one processor; and one or more non-transitory computer-readable media storing computer-executable instructions that, when executed by the at least one processor, perform a method for providing a role-based workflow in a group-based communication system, the method comprising:

receiving one or more role selections from an administrator user assigned to an administrator user role within the group-based communication system, the one or more role selections associated with a plurality of operations of the role-based workflow;

assigning a plurality of users of the group-based communication system to respective roles associated with the role-based workflow based on the one or more role selections from the administrator user, wherein the respective roles associated with the role-based workflow comprise a standard user role and a management user role; and initiating the role-based workflow responsive to receiving a user input from a standard-role user such that the plurality of operations of the role-based workflow are performed, wherein the plurality of operations of the role-based workflow include:

generating a request based on the user input received from the standard-role user;

generating a subsequent request based on a subsequent user input received from a subsequent user assigned to the standard user role;

adding the request and the subsequent request to a request queue;

transmitting the request queue to a management-role user for approval of one or more requests included in the request queue;

receiving, from the management-role user, one or more responses to the one or more requests included in the request queue; and storing information associated with the one or more requests included in the request queue and the one or more responses in a data store associated with the group-based communication system such that the information is accessible to the administrator user.

16. The system of claim 15, wherein the plurality of operations of the role-based workflow are based on a pre-existing workflow.

17. The system of claim 15, wherein the one or more responses received from the management-role user comprise one or more approvals of the one or more requests included in the request queue.

18. The system of claim 17, the method further comprising:

responsive to receiving the one or more approvals of the one or more requests included in the request queue, transmitting the request queue to a subsequent user assigned to the management user role for further approval of the one or more requests included in the request queue;

receiving one or more subsequent approvals of the one or more requests included in the request queue from the subsequent user assigned to the management user role; and responsive to receiving the one or more subsequent approvals of the one or more requests included in the request queue, performing one or more actions within the group-based communication system based on the one or more requests included in the request queue.

19. The system of claim 15, wherein the one or more responses received from the management-role user comprise one or more denials of the one or more requests included in the request queue.

20. The system of claim 19, the method further comprising:

responsive to receiving the one or more denials of the one or more requests, notifying one or more of the standard-role user and the subsequent user assigned to the standard user role of denial.

* * * * *